(12) United States Patent
Tong

(10) Patent No.: US 9,008,241 B1
(45) Date of Patent: Apr. 14, 2015

(54) LOW COMPLEXITY NEAR OPTIMAL TWO SPATIAL STREAM MAXIMAL LIKELIHOOD DETECTOR

(71) Applicant: Samsung Electronics Co., Ltd., Gyeonggi-do (KR)

(72) Inventor: Fei Tong, Bassingbourn (GB)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/224,750

(22) Filed: Mar. 25, 2014

Related U.S. Application Data

(60) Provisional application No. 61/895,741, filed on Oct. 25, 2013.

(51) Int. Cl.
*H03D 1/00* (2006.01)
*H04L 27/06* (2006.01)
*H04B 7/04* (2006.01)
(Continued)

(52) U.S. Cl.
CPC ............. *H04B 7/0413* (2013.01); *H04L 27/38* (2013.01); *H04L 1/0054* (2013.01)

(58) Field of Classification Search
USPC ......... 375/341, 332, 329, 320, 261, 262, 264, 375/268, 279, 280, 281, 260, 267, 347; 714/794; 329/304
See application file for complete search history.

(56) References Cited

U.S. PATENT DOCUMENTS

| | | | |
|---|---|---|---|
| 6,834,088 B2 * | 12/2004 | Agami et al. | 375/324 |
| 7,616,699 B2 * | 11/2009 | Niu et al. | 375/267 |
| 7,660,368 B2 * | 2/2010 | Ling et al. | 375/332 |

(Continued)

OTHER PUBLICATIONS

Kwan-wai Wong et al., A VLSI Architecture of a K-Best Lattice Decoding Algorithm for MIMO Channels, Copyright 2002 IEEE, pp. 273-276.

(Continued)

*Primary Examiner* — Phuong Phu
(74) *Attorney, Agent, or Firm* — The Farrell Law Firm, P.C.

(57) ABSTRACT

Methods, apparatuses, and systems are provided for generating a candidate search set for ML detection of $2^n$-QAM signals transmitted on two or more MIMO spatial streams. A method includes estimating an initial solution $y_q$ for a received $2^n$-QAM symbol value $b_0 b_1 \ldots b_{n-1}$, wherein all possible $2^n$-QAM symbol values are Gray-mapped constellation points; and performing an iteration for each hypothetical value of each bit position i of the initial solution $y_q$, wherein each iteration comprises: determining a search center as: if $i^{th}$ bit of the initial solution equals the hypothetical value assumed for the current iteration, the initial solution $y_q$; or if $i^{th}$ bit of the initial solution does not equal the hypothetical value assumed for the current iteration, a mirror constellation point $y_{qc}$ to the initial solution $y_q$; and searching outward from the determined search center for candidate constellation points.

28 Claims, 3 Drawing Sheets

(51) Int. Cl.
  *H04L 27/38* (2006.01)
  *H04L 1/00* (2006.01)

(56) References Cited

U.S. PATENT DOCUMENTS

| | | | |
|---|---|---|---|
| 7,746,951 B2* | 6/2010 | Hwang et al. | 375/267 |
| 8,204,160 B2* | 6/2012 | Bottomley | 375/341 |
| 8,401,127 B1* | 3/2013 | Lee et al. | 375/341 |
| 8,559,566 B2* | 10/2013 | Yu et al. | 375/340 |
| 2003/0102905 A1* | 6/2003 | Ha et al. | 329/304 |
| 2004/0141564 A1* | 7/2004 | Da-Silva-Valente et al. | 375/261 |
| 2004/0264593 A1* | 12/2004 | Shim et al. | 375/267 |
| 2006/0029162 A1* | 2/2006 | Chi | 375/340 |
| 2006/0045211 A1* | 3/2006 | Oh et al. | 375/329 |
| 2010/0183065 A1* | 7/2010 | Siti et al. | 375/233 |

OTHER PUBLICATIONS

Filippo Tosato et al., Simplified Soft-Output Demapper for Binary Interleaved COFDM with Application to HIPERLAN/2, Copyright Hewlett-Packard Company 2001, pp. 6.

Manar Mohaisen et al., Efficiency Improvement of the . . . , KSII Transactions on Internet and Information Systems vol. 5, No. 3, Mar. 2011, Copyright 2011 KSII, pp. 494-507.

Babak Hassibi et al., On the Expected Complexity of Sphere Decoding, Copyright 2001 IEEE, pp. 1051-1055.

Luis G. Barbero et al., A Low-Complexity Soft-MIMO Detector Based on the Fixed-Compexity Sphere Decoder, Copyright 2008 IEEE, pp. 2669-2672.

Rizwan Ghaffar et al., Low Complexity Metrics for BICM SISO and MIMO systems, Copyright 2010 IEEE, pp. 6.

* cited by examiner

LOW COMPLEXITY NEAR OPTIMAL TWO SPATIAL STREAM MAXIMAL LIKELIHOOD DETECTOR

PRIORITY

The present application claims priority under 35 U.S.C. §119(e) to U.S. Provisional Application No. 61/895,741, entitled "Low Complexity Near Optimal Two Spatial Stream Maximal Likelihood Detector," which was filed on Oct. 25, 2013, the contents of which are incorporated herein by reference.

BACKGROUND OF THE INVENTION

1. Field of the Invention

The present invention relates generally to a low complexity near optimal two spatial stream maximal likelihood detector, and more particularly to a low complexity two spatial stream maximal likelihood detection method with the flexibility to limit processing throughput.

2. Description of the Related Art

A Multiple Input Multiple Output (MIMO) spatial multiplexing configuration significantly increases spectral efficiency: the gain is proportional to the number of spatial streams provided by the MIMO channel (i.e., the rank of the MIMO channel matrix). This technology has been adopted in both the IEEE 802.11n and 802.11ac WLAN standards, which provide high throughput with existing channelization bandwidth. However, to achieve this spectral efficiency gain, a linear MIMO receiver requires a higher signal-to-noise ratio (SNR) than non-spatial multiplexing receivers. In real environments, this translates to limited high throughput coverage, i.e. a station can only benefit from the use of spatial multiplexing in limited spots where scattering is rich and SNR is high.

Compared to linear detection, maximal likelihood (ML) detection can reduce the SNR requirement for MIMO detection. However, ML algorithm requires finding the nearest lattice coordinates, which is a NP problem with a complexity in the order of $O(M^L)$, where M is the size of the QAM set and L is the number of spatial streams, assuming equal modulation orders over all spatial streams. In the IEEE 802.11ac amendment, a new modulation order (256-QAM) is added, which dramatically increases the computation complexity for a ML detector. This change in the specification makes this detection method unduly difficult for real time implementation even for low rank (e.g., two spatial stream) spatial multiplexing.

Although the attempts to reduce ML detector complexity show that the ML detector complexity can be reduced to $O(M^{L-1})$ without a loss of performance, this still results in very high complexity especially considering soft value output MLD is generally used in high order modulation. Similarly, sphere decoder methods have been shown to reduce the complexity by restricting the search in a sphere space centered at the initial Minimum Mean Error Square (MMSE) detection result, but, due to its depth first searching order, the number of candidates searched is variable. Breadth-first search algorithms, such as K-best, have a fixed number of candidates and hence a fixed computation throughput. Similarly to breadth-first algorithms, List detectors store visited candidate vectors in a list and a soft value can be derived from searching this list. In both sphere and List algorithms, the candidate sets are defined in the pre-transferred space. This does not guarantee that the complementary hypothesis for each bit position is included in the candidate set, which causes performance loss for both algorithms especially when the channel matrix is noticeably skewed.

Thus, there is a need for systems, devices, and methods for reducing ML detector complexity with an insignificant loss of performance.

SUMMARY OF THE INVENTION

Accordingly, the present invention is designed to address at least the problems and/or disadvantages described above and to provide at least the advantages described below. In one aspect of the invention, a low complexity maximal likelihood detection method for two spatial streams is provided with the flexibility to limit the maximum processing throughput. In another aspect of the invention, a low complexity maximal likelihood detection method for two or more spatial streams is provided with reduced complexity without substantially reduced performance.

According to one aspect of the present invention, a method for generating a candidate search set for Maximal Likelihood (ML) detection of $2^n$-Quadrature Amplitude Modulation ($2^n$-QAM) signals transmitted on two or more Multiple Input Multiple Output (MIMO) spatial streams is provided, including: estimating an initial solution $y_q$ for a received $2^n$-QAM symbol value $b_0 b_1 \ldots b_{n-1}$, wherein all possible $2^n$-QAM symbol values are Gray-mapped constellation points; and performing an iteration for each hypothetical value of each bit position i of the initial solution $y_q$, wherein each iteration comprises: determining a search center as: if $i^{th}$ bit of the initial solution equals the hypothetical value assumed for the current iteration, the initial solution $y_q$; or if $i^{th}$ bit of the initial solution does not equal the hypothetical value assumed for the current iteration, a mirror constellation point $y_{qc}$ to the initial solution $y_q$; and searching outward from the determined search center for candidate constellation points.

According to another aspect of the present invention, a method for generating a candidate search set for Maximal Likelihood (ML) detection of $2^n$-Quadrature Amplitude Modulation ($2^n$-QAM) signals transmitted on two or more Multiple Input Multiple Output (MIMO) spatial streams is provided, including: estimating an initial solution $y_q$ for a received $2^n$-QAM symbol value $b_0 b_1 \ldots b_{n-1}$, wherein all possible $2^n$-QAM symbol values are Gray-mapped constellation points; and looking up a candidate search set corresponding to the initial solution $y_q$ in a Look-Up Table (LUT), wherein candidate search sets in the LUT were generated by: performing an iteration for each hypothetical value of each bit position i of an initial solution $y_q$, wherein each iteration comprises: determining a search center as: if $i^{th}$ bit of the initial solution equals the hypothetical value assumed for the current iteration, the initial solution $y_q$; or if $i^{th}$ bit of the initial solution does not equal the hypothetical value assumed for the current iteration, a mirror constellation point $y_{qc}$ to the initial solution $y_q$; and searching outward from the determined search center for candidate constellation points.

According to yet another aspect of the present invention, a mobile device is provided, including: a receiver configured to receive $2^n$-Quadrature Amplitude Modulation ($2^n$-QAM) signals transmitted from two or more Multiple Input Multiple Output (MIMO) spatial streams; one or more processors capable of performing a method for generating a candidate search set for Maximal Likelihood (ML) detection of received $2^n$-QAM signals; and at least one non-transitory computer-readable medium storing instructions that, when executed, causes the one or more processors to perform the method for generating a candidate search set for ML detection of received $2^n$-QAM signals, the method comprising: estimating an initial solution $y_q$ for a received $2^n$-QAM symbol value $b_0 b_1 \ldots b_{n-1}$, wherein all possible $2^n$-QAM symbol values are Gray-mapped constellation points; and performing an iteration for each hypothetical value of each bit position i of the initial solution $y_q$, wherein each iteration comprises: determining a search center as: if $i^{th}$ bit of the initial solution equals the hypothetical value assumed for the current iteration, the initial solution $y_q$; or if $i^{th}$ bit of the initial solution does not equal the hypothetical value assumed for the current iteration, a mirror constellation point $y_{qc}$ to the initial solution $y_q$; and searching outward from the determined search center for candidate constellation points.

According to still yet another aspect of the present invention, a mobile device is provided, including: a receiver configured to receive $2^n$-Quadrature Amplitude Modulation ($2^n$-QAM) signals transmitted from two or more Multiple Input Multiple Output (MIMO) spatial streams; one or more processors capable of performing a method for generating a candidate search set for Maximal Likelihood (ML) detection of received $2^n$-QAM signals; and at least one non-transitory computer-readable medium storing instructions that, when executed, causes the one or more processors to perform the method for generating a candidate search set for ML detection of received $2^n$-QAM signals, the method comprising: estimating an initial solution $y_q$ for a received $2^n$-QAM symbol value $b_0 b_1 \ldots b_{n-1}$, wherein all possible $2^n$-QAM symbol values are Gray-mapped constellation points; and looking up a candidate search set corresponding to the initial solution $y_q$ in a Look-Up Table (LUT), wherein candidate search sets in the LUT were generated by: performing an iteration for each hypothetical value of each bit position i of the initial solution $y_q$, wherein each iteration comprises: determining a search center as: if $i^{th}$ bit of the initial solution equals the hypothetical value assumed for the current iteration, the initial solution $y_q$; or if $i^{th}$ bit of the initial solution does not equal the hypothetical value assumed for the current iteration, a mirror constellation point $y_{qc}$ to the initial solution $y_q$; and searching outward from the determined search center for candidate constellation points.

According to a still further aspect of the present invention, a non-transitory computer-readable medium is provided which stores instructions that, when executed by one or more processors, performs a method for generating a candidate search set for Maximal Likelihood (ML) detection of $2^n$-Quadrature Amplitude Modulation ($2^n$-QAM) signals transmitted on two or more Multiple Input Multiple Output (MIMO) spatial streams, the method including: estimating an initial solution $y_q$ for a received $2^n$-QAM symbol value $b_0 b_1 \ldots b_{n-1}$, wherein all possible $2^n$-QAM symbol values are Gray-mapped constellation points; performing an iteration for each hypothetical value of each bit position i of the initial solution $y_q$, wherein each iteration comprises: determining a search center as: if $i^{th}$ bit of the initial solution equals the hypothetical value assumed for the current iteration, the initial solution $y_q$; or if $i^{th}$ bit of the initial solution does not equal the hypothetical value assumed for the current iteration, a mirror constellation point $y_{qc}$ to the initial solution $y_q$; and searching outward from the determined search center for candidate constellation points According to yet still further aspect of the present invention, a non-transitory computer-readable medium is provided which stores instructions that, when executed by one or more processors, performs a method for generating a candidate search set for Maximal Likelihood (ML) detection of $2^n$-Quadrature Amplitude Modulation ($2^n$-QAM) signals transmitted on two or more Multiple Input Multiple Output (MIMO) spatial streams, the method including: estimating an initial solution $y_q$ for a received $2^n$-QAM symbol value $b_0 b_1 \ldots b_{n-1}$, wherein all possible $2^n$-QAM symbol values are Gray-mapped constellation points; and looking up a candidate search set corresponding to the initial solution $y_q$ in a Look-Up Table (LUT), wherein candidate search sets in the LUT were generated by: performing an iteration for each hypothetical value of each bit position i of an initial solution $y_q$, wherein each iteration comprises: determining a search center as: if $i^{th}$ bit of the initial solution equals the hypothetical value assumed for the current iteration, the initial solution $y_q$; or if $i^{th}$ bit of the initial solution does not equal the hypothetical value assumed for the current iteration, a mirror constellation point $y_{qc}$ to the initial solution $y_q$; and searching outward from the determined search center for candidate constellation points.

According to yet still another aspect of the present invention, a method is provided for generating a candidate search set for Maximal Likelihood (ML) detection of $2^n$-Quadrature Amplitude Modulation ($2^n$-QAM) signals transmitted on two or more Multiple Input Multiple Output (MIMO) spatial streams by performing an iteration for each hypothetical value of each bit position i of an initial solution y of a received $2^n$-QAM symbol value $b_0 b_1 \ldots b_{n-1}$, wherein all possible $2^n$-QAM symbol values are Gray-mapped constellation points, wherein each iteration includes: determining a search center as: if $i^{th}$ bit of the initial solution equals the hypothetical value assumed for the current iteration, the initial solution $y_q$; or if $i^{th}$ bit of the initial solution does not equal the hypothetical value assumed for the current iteration, a mirror constellation point $y_c$ to the initial solution y; and searching outward from the determined search center for candidate constellation points.

BRIEF DESCRIPTION OF THE DRAWINGS

The above and other aspects, features, and advantages of embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

A key feature of this invention is the selection of non-adjacent points, which include both hypotheses for all bit positions; this selective search space will generate a soft value with better accuracy without increasing the search space.

Two techniques are used to achieve this selective search space.

First, unlike conventional sphere decoding, in which the search space per each spatial stream is limited around the initial MMSE solution, in this approach, multiple non-adjacent clusters of points are included in the search, one centered around the initial MMSE solution and the other ones centered around the complementary point of the MMSE solution per bit position. Using the geometric relationships of a gray mapped constellation, the complementary point can be found easily by only shifting in either the real or the imaginary dimension (i.e., either the x- or y-axis). Once the candidate set for one spatial stream is determined, only one point with the most likelihood on the other spatial stream is chosen as the hypothesis.

Second, the distinct two-dimensional candidates are combined together while calculating log-likelihood ratio (LLR) so that LLRs for both spatial streams have the same candidate set size.

The two techniques together produce a set of non-adjacent candidate points in a two dimensional complex space, which differentiates this approach significantly from conventional sphere decoding methods (as discussed further below).

Figure 1:
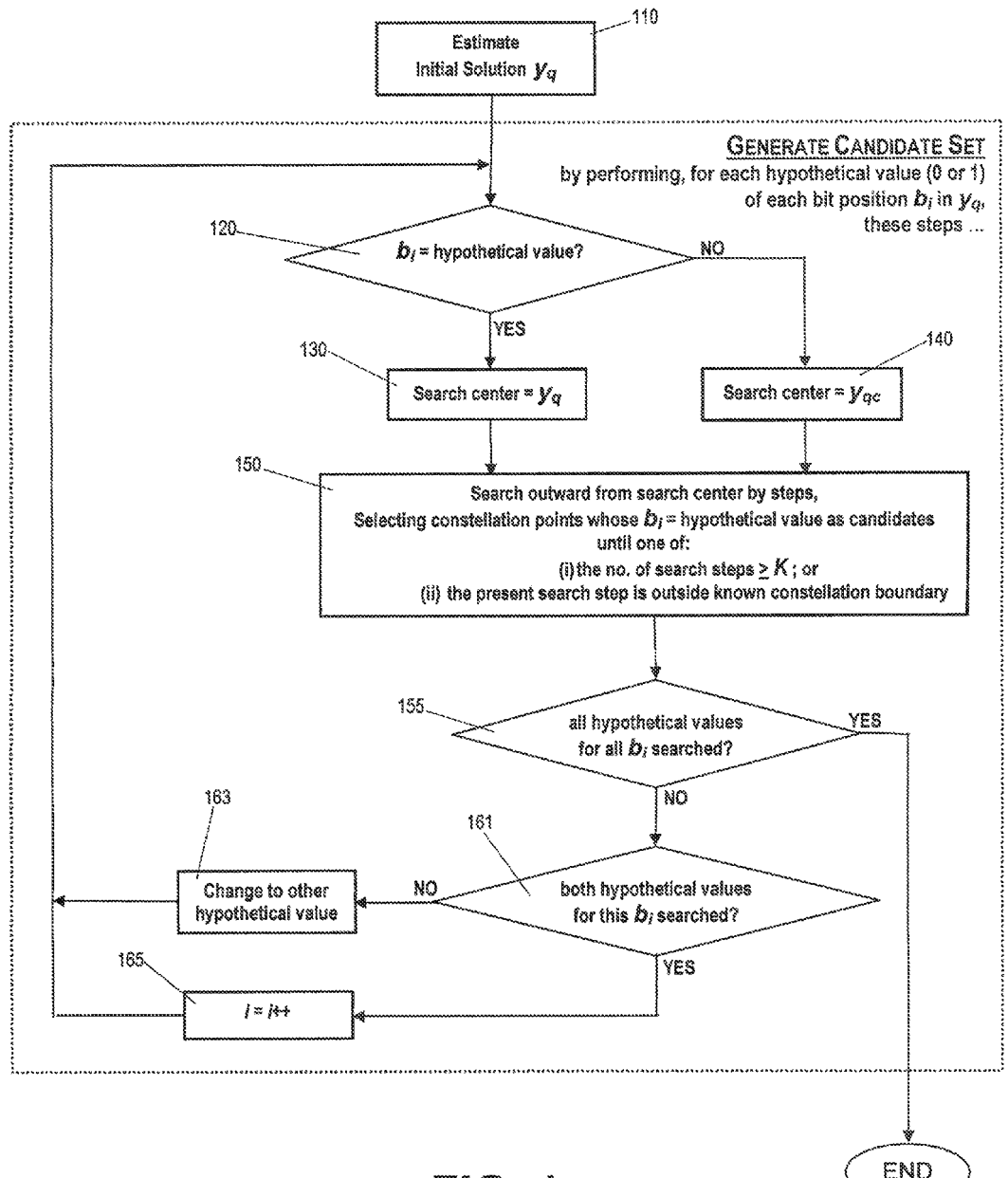
FIG. 1 is a flowchart of a method of candidate selection according to an embodiment of the present invention.

FIG. 1 is a flowchart of a method for generating a set of candidate constellation points according to an embodiment of the present invention. The set of candidate constellation points is generated by performing searching and selection over a number of iterations, where each iteration considers one hypothesis per bit position $b_i$ in $y_{estimated} = b_0 b_1 \ldots b_{n-1}$, where $y_{estimated}$ is the estimated value of the symbol received as a $2^n$-Quadrature Amplitude Modulation ($2^n$-QAM) signal in one spatial stream among two or more Multiple Input Multiple Output (MIMO) spatial streams.

In step 110, the method starts with an initial estimated solution $y_q$, the closest constellation point (via simple quantization) to the MMSE solution y. From this initial estimate, a candidate set can be generated, as shown in steps 120-165. As shown below, each of steps 120-165 are performed for each hypothesis (0 or 1) for each bit position $b_i$.

In step 120, it is determined whether the instant bit at position i in $y_q$ equals the present hypothetical value (i.e., $b_i$=hypothetical value?). If so, the search center going forward is the constellation point $y_q$ in step 130. If not, the search center is mirror constellation point $y_{qc}$ in step 140 (methods to find mirror point $y_{qc}$ are discussed below). After either of steps 130 and 140, a search is performed from the determined search center. Specifically, the search proceeds outward by steps, where constellation points whose $b_i$=hypothetical value are selected as points in the candidate set, and the searching ends when either of (i) the number of search steps reaches a preset limit K, or (ii) the present search step is outside the known constellation boundary.

Once the search in step 150 is over, it is determined whether searches have been performed under both hypotheses for each bit position $b_i$ in $y_q$ in step 155. If so, the method is over (at least for generating the candidate set for the symbol received on this spatial stream). If not, it is determined whether both hypotheses (0 and 1) have been searched for the instant bit position $b_i$ in step 161. If so, the method moves on to the next bit position in step 165 (i=i++). If not, the method switches to the other hypothesis in step 163 so it can be searched. After either of steps 163 and 165, the method loops back and repeats.

As shown above, in the low complexity method to generate search candidates according to embodiments of the present invention, the candidate generation process is done through searching a lattice centered around an initial estimate of the solution. The following assumptions are made concerning the QAM mapping of the constellation points:

The constellation is square shaped and the spacing along each of the x/y axes is 1 (for scaled constellation points, not magnitude).

The constellation boundary is known for a given modulation order

Gray mapping is used to map the bit sequences to the constellation

To avoid the calculation of distance (to check if a constellation symbol falls inside the search boundary, which is necessary for a circle shaped boundary), the search area is a square shape so that iterating through all the discrete points can be achieved by stepping with definite iterations with boundary checking.

As discussed above, the method according to one embodiment of the present invention starts with $y_q$, the closest constellation point via quantization to MMSE solution y. The constellation is on integer lattice, the minimum distance between neighboring points is 2 (in magnitude). The search consists of a number of iterations: each iteration is per one bit position and one hypothesis (0/1).

One iteration comprises (the example below assumes the $i^{th}$ bit position with the hypothesis of 1):

Determine the search center by:
If $i^{th}$ bit of constellation point $y_q$ equals 1, the search center is $y_q$
If $i^{th}$ bit of constellation point $y_q$ equals 0, the search center is the mirror point $y_{qc}$ of $y_q$, which is the constellation point closest to $y_q$ whose $i^{th}$ bit equals 1 (a method to find $y_{qc}$ is described below)

Search from the determined search center in four directions (left and right, up and down) with steps of 2 (in magnitude). In each step, only constellation points with the $i^{th}$ bit equal to 1 are kept in the candidate set.

The search stops when either of the following conditions are satisfied:
The number of steps is equal to or greater than K (=search range/limit)
The search is outside the constellation (i.e., the next step is to a point outside the known constellation boundary)

The complexity can be further reduced by restricting the search area size in the complementary bit hypothesis, e.g., the search range for the complementary hypothesis can be smaller than K (in one extreme, only one point with the complementary bit hypothesis is included).

An important feature of this invention is that the search area is conditioned on the hypothesis that the bit position is taken as 0 or 1. To achieve this, the searching center is shifted according to the hypothesis (of 1 or 0). When the search is taken for the hypothesis that the $i^{th}$ bit has the value opposite to the initial MMSE solution, the search center is moved to a "mirror point," which is the constellation point closest to the MMSE solution which satisfies the hypothesis (of an opposite value for the $i^{th}$ bit). Using the geometric relationships of a gray mapped constellation, such a mirror point can be found easily. Finding the point only involves shifting the position on the x or y axis depending on whether the bit is carried in the real or the imaginary part of the QAM symbol.

Figure 2:
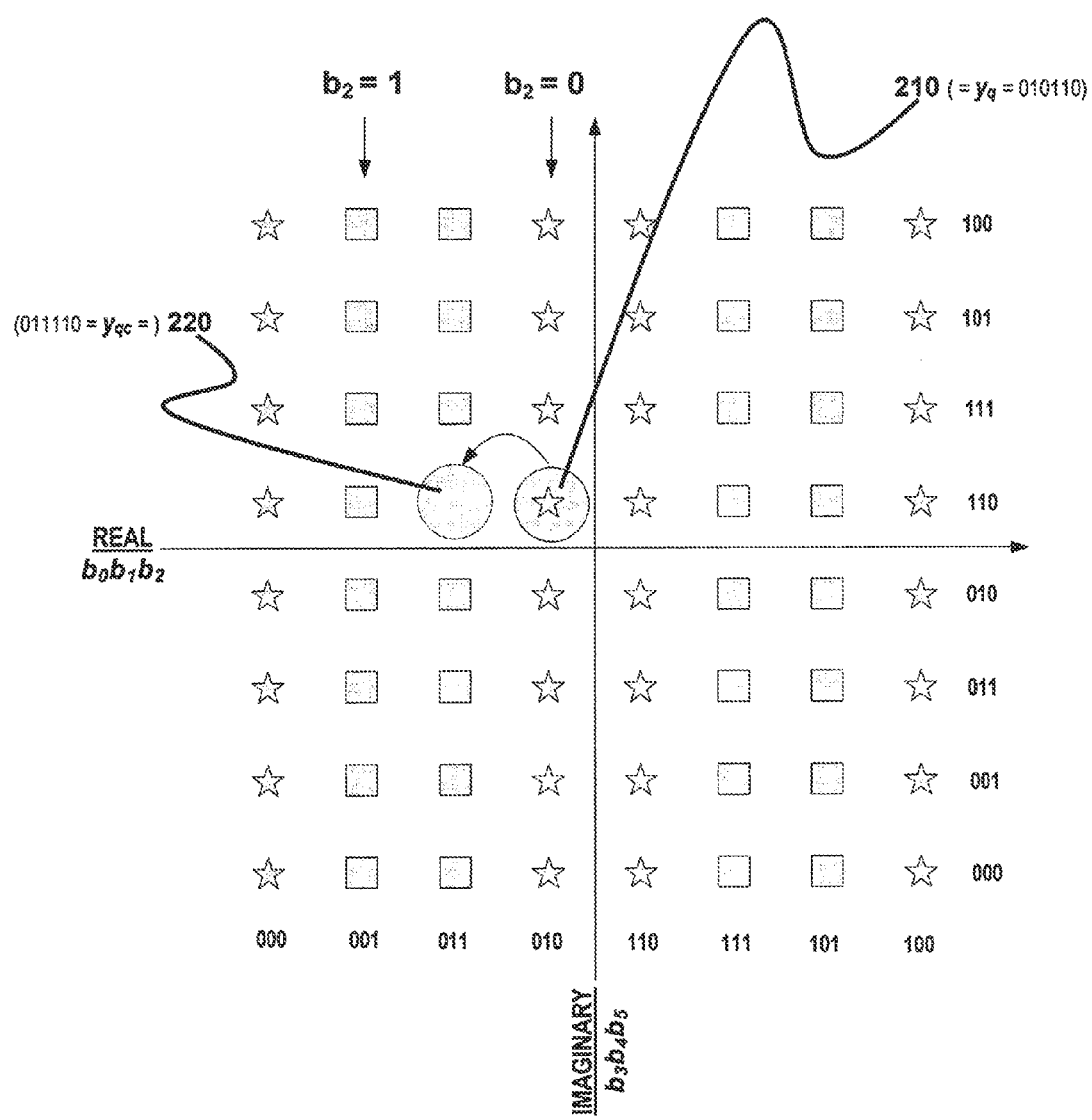
FIG. 2 is a diagram of a Gray-mapped 64-QAM constellation showing the shift of search center according to an embodiment of the present invention.

An example of shifting the search center is illustrated in FIG. 2. FIG. 2 is a Gray-mapped 64-QAM constellation where each symbol is six bits $b_0 b_1 b_2 b_3 b_4 b_5$, comprising three bits transmitted on the real part of the signal ($b_0 b_1 b_2$, whose Gray-mapped values are shown on the bottom of FIG. 2) and three bits transmitted on the imaginary part of the signal ($b_3 b_4 b_5$, whose Gray-mapped values are shown on the right-hand side of FIG. 2). Thus, circle 210 in FIG. 2 indicates the constellation point, i.e., the symbol, corresponding to $b_0b_1b_2b_3b_4b_5=010110$ (where $b_0b_1b_2=$real part=010; $b_3b_4b_5=$imaginary part=110).

Assuming the constellation point indicated by circle 210 is the MMSE solution $y_q$, let us also assume the iteration we are performing concerns the $3^{rd}$ bit in the real part of the corresponding number (since i starts at 0, the $3^{rd}$ bit is designated bit $b_2$, because i=2) and the hypothesis is $b_2=0$. For this hypothesis, the constellation point indicated by circle 210 is the appropriate search center, because $b_2$ in 010 is indeed 0. Thus, the search would begin from this search point. On the other hand, for the hypothesis $b_2=1$, we need to use, as the search center, the mirror point corresponding to the constellation point indicated by circle 210. The mirror point $y_{qc}$ is indicated by the circle 220, which has its $3^{rd}$ bit equals to 1 ($b_2=1$ in 011) and is the closest constellation point to the MMSE solution $y_q$ among all of the constellation points whose $3^{rd}$ bit equals 1 ($b_2=1$), which are denoted as square symbols in FIG. 2. All of the points whose $3^{rd}$ bit equals 0 ($b_2=0$) are denoted as star symbols in the constellation of FIG. 2.

More generally, the mirror point of any constellation point may be found using the following method, which relies upon the fact that, for any Gray-mapped QAM modulation constellation, each bit position ($i^{th}$ bit) of each constellation point has a signed value $L_i(y_q)$, whose absolute value indicates its distance to the nearest point with the opposite bit value and whose sign indicates the bit value. The calculation of this can be found in Filippo Tosato et al., "Simplified Soft-Output Demapper for Binary Interleaved COFDM with Application to HIPERLAN/2," Image Systems Laboratory/HP Labs Bristol, Paper No. HPL-2001-246 (Oct. 16, 2001), the entire contents of which are incorporated herein by reference. In Equations 1a/b and 2 below (corresponding to equations 24 and 25 in Tosato et al.), n denotes the total number of bits represented by the modulation and $D_i$ denotes half of the distance between the partition boundaries relative to the $i^{th}$ bit; as in Gray-mapping, the lower bits are mapped to the real part and the upper bits are mapped to the imaginary part.

$$L_i(y_q) = \begin{cases} \text{real}(y_q), & i = 0 \\ -|L_{i-1}(y_q)| + D_i, & 0 < i < \frac{n}{2} \end{cases} \quad (1a)$$

$$L_i(y_q) = \begin{cases} \text{imag}(y_q), & i = \frac{n}{2} \\ -|L_{i-1}(y_q)| + D_i, & \frac{n}{2} < i < n \end{cases} \quad (1b)$$

$$D_i = \begin{cases} 16, & \text{mod}\left(i, \frac{n}{2}\right) = 1 \\ 8, & \text{mod}\left(i, \frac{n}{2}\right) = 2 \\ 4, & \text{mod}\left(i, \frac{n}{2}\right) = 3 \\ 2, & \text{mod}\left(i, \frac{n}{2}\right) = 4 \end{cases} \quad (2)$$

For instance, the $L_2(y_q)$ of constellation point 210 as $y_q$ would have a sign value indicating the $3^{rd}$ bit position has a value of 0 ($b_2=0$), and an absolute value indicating the distance to the closest complementary hypothesis is 1 (i.e., it is only one hop to a point where $b_2=1$, viz., point 220=011). We therefore denote this per $i^{th}$ bit value as $b_i(y_q)$, which can be derived from the following equation:

$$b_i(y_q) = \begin{cases} 0, & L_i(y_q) < 0 \\ 1, & L_i(y_q) > 0 \end{cases} \quad (3)$$

For a given constellation point, the mirror point is the point with an opposite value in the specified bit position, i.e., the $i^{th}$ bit. To find the mirror point, we only need shift in one of the two QAM dimensions (i.e., in either the real or the imaginary dimension, see, e.g., the example of 64-QAM shown in FIG. 2).

In the 64-QAM example of FIG. 2, for bit positions i=0, 1, 2, which lie on the x-axis, i.e., the real axis, the shift direction is determined as:

$$S_i(y_q) = \Pi_{k=1}^{i} b_k(y_q) \quad (4)$$

The real part of the mirror point $y_{qc}$ can be expressed as $\text{real}(y_{qc})=\text{real}(y_q)+S_i(y_q) \cdot L_i(y_q)$, and the imaginary part will remain the same, i.e., $\text{imag}(y_{qc})=\text{imag}(y_q)$.

For bit positions i=3, 4, 5, which lie on the y-axis, i.e., the imaginary axis, the shift direction is determined as:

$$S_i(y_q) = \Pi_{k=3}^{i} b_k(y_q) \quad (5)$$

The real part of the mirror point $y_{qc}$ will remain the same, i.e., $\text{real}(y_{qc})=\text{real}(y_q)$, and the imaginary part can be expressed as $\text{imag}(y_{qc})=\text{imag}(y_q)+S_i(y_q) \cdot L_i(y_q)$.

For 256-QAM (having 8-bit symbols $b_0b_1b_2b_3b_4b_5b_6b_7$), the equations would be the same, except that bit positions i=0, 1, 2, 3 would lie on the x-axis/real axis, and bit positions i=4, 5, 6, 7 would lie on the y-axis/imaginary axis.

Embodiments of the present invention provide a simple and robust method of candidate generation which iterates through the region neighboring both the initial solution point and the complementary hypothesis per bit position. Prior to the present invention, iterating through the neighboring region (around both initial ZF/MMSE solution point and the point with complementary hypothesis per a bit position) efficiently was not a trivial problem, and involved at least the following difficulties:

(1) finding out the M closest points or all the points within a certain range among the whole symbol set requires brutal search and calculation of the distance, which is computationally costly (2) symbols in the subset (of the constellation) conditioned on $i^{th}$ bit equals to 0/1 are not adjacent to each other, thus searching within a fixed radius could lead to empty set, which will compromise the maximal likelihood detection performance.

In addition to providing an efficient method to iterate through constellation candidates by shifting the search centre depending on the hypothesis of a bit position, the two techniques combined together in the embodiments of the present invention produce a set of non-adjacent candidate points in a two-dimensional complex space, which differentiates this approach significantly from conventional sphere decoding methods. A conventional sphere decoder searches a sub-set of all the candidate symbols in a neighboring region (defined by a high-dimension sphere with certain radius, also called a search lattice) of the ZF/MMSE solution. If the search lattice is small, the search lattice likely does not include the symbols with both hypotheses (0/1) for every bit position. This will compromise soft value precision.

By contrast, in this invention, the search is performed not only a neighboring region centered around the initial ZF/MMSE solution, but also in the neighboring region around the complementary hypothesis per bit position (with respect to the ZF/MMSE solution). Therefore, for each hypothesis (0/1), there will be equal number of candidates in the search lattice. This will improve the LLR accuracy while maintain the complexity constant (measured by the number of searches).

Simulation results in comparison with other suggested methods show that a key advantage of embodiments of the present invention is the low complexity with near optimal performance. Table 1 below summarizes the complexity, in terms of candidate set size, of variants of MLD. In Table 1, "Full ML" refers to MLD without any complexity reduction; "Fast ML" refers to the method described in Ghaffar R. and Knopp R., "Low Complexity Metrics for BICM SISO and MIMO systems," *Vehicular Technology Conference (VTC 2010-Spring) May 2010 IEEE 71st*, which is hereby incorporated by reference in its entirety; "Extended List" refers to the method described in Barbero L. G., Ratnarajah T. and Cowan C. "A low-complexity soft-MIMO detector based on the fixed-complexity sphere decoder," in *Proc. IEEE ICASSP '08*, March 2005, pp. 2669-2672, which is hereby incorporated by reference in its entirety; and "Proposed ML" refers to an embodiment of the present invention where K=1 for both hvaotheses.

TABLE 1

Complexity comparison of various MLD algorithms.

|  | 16-QAM | 64-QAM | 256-QAM |
| --- | --- | --- | --- |
| Full ML | 256 | 4096 | 65536 |
| Fast ML [1] | 32 | 128 | 512 |
| Ex. List [4] | 20 | 70 | 264 |
| Proposed ML | 32 | 54 | 78 |

As shown in Table 1, embodiments of the present invention have a reduced processing complexity in comparison with other techniques for reducing ML detector complexity and, more importantly, scales more easily upward, i.e., the increase in complexity of Proposed ML as the modulation order increases is slow compared to the other methods.

Figure 3A:
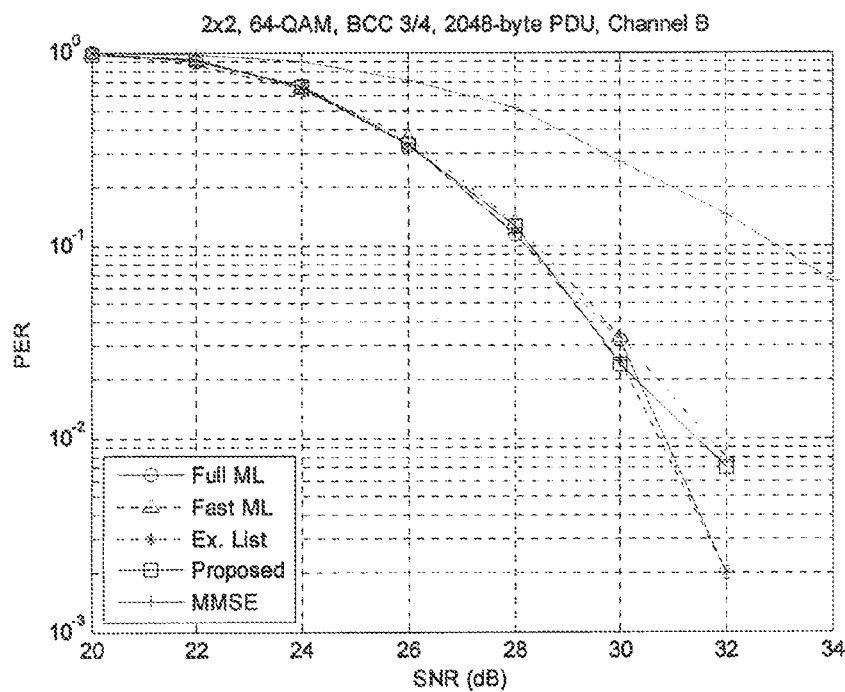
FIGS. 3A and 3B are graphs comparing the performance of other methods against an embodiment of the present invention.
Figure 3B:
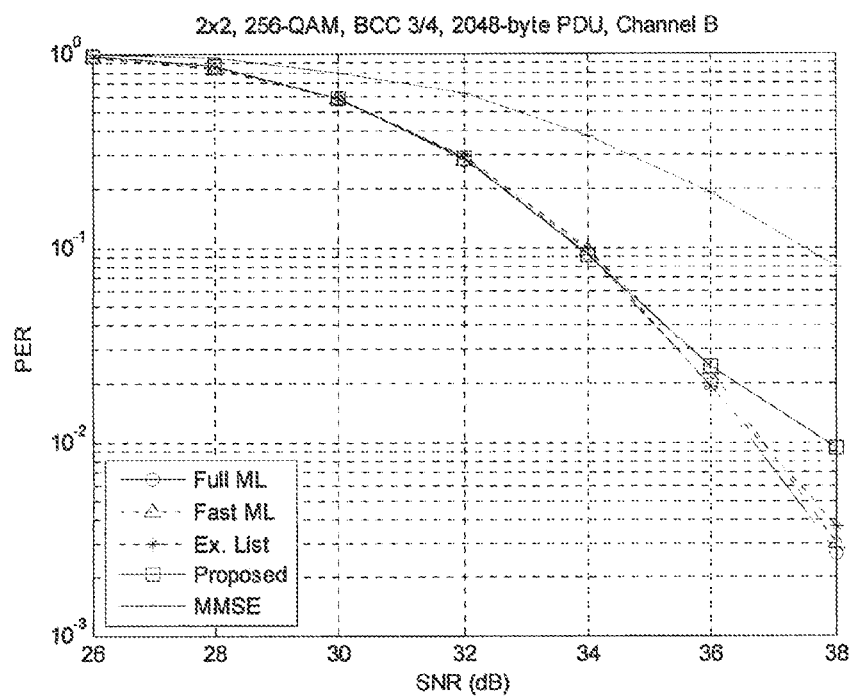

With more than halved complexity (compared to Fast ML on 64-QAM and 256-QAM case), the performance loss of embodiments of the present invention is negligible. The plots in FIGS. 3A and 3B show the performance comparison between the four methods.

As would be understood by one of ordinary skill in the art, there are various ways of implementing the present invention, such as, for example, using a pre-computed table storing the candidate sets of disjointed neighbors. In this alternative method, the candidate sets per such possible MMSE solution can be pre-generated and stored in a table, which requires more memory but avoids processing latency.

Depending on the embodiment of the present invention, some or all of the steps and/or operations may be implemented or otherwise performed, at least in part, on a mobile device. "Mobile device" as used herein refers to any portable electronic device having the capability of receiving of $2^n$-Quadrature Amplitude Modulation ($2^n$-QAM) signals transmitted on two or more Multiple Input Multiple Output (MIMO) spatial streams, including, but not limited to, multimedia players, communication devices, computing devices, navigating devices, etc. Thus, mobile devices include (but are not limited to) laptops, tablet computers, Portable Digital Assistants (PDAs), mp3 players, handheld PCs, Instant Messaging Devices (IMD), cellular telephones, Global Navigational Satellite System (GNSS) receivers, watches, or any such device which can be worn and/or carried on one's person.

Depending on the embodiment of the present invention, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof.

The one or more non-transitory computer-readable media and/or means for implementing/performing one or more operations/steps of an embodiment of the present invention may include, without limitation, application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of any system components and data structures may also be stored as data signals (e.g., by being encoded as part of a carrier wave or included as part of an analog or digital propagated signal) on a variety of non-transitory computer-readable transmission mediums, from which they are read and then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced any computer system configuration.

Thus, the term "non-transitory computer-readable medium" as used herein refers to any medium that comprises the actual performance of an operation (such as hardware circuits), that comprises programs and/or higher-level instructions to be provided to one or more processors for performance/implementation (such as instructions stored in a non-transitory memory), and/or that comprises machine-level instructions stored in, e.g., firmware or non-volatile memory. Non-transitory computer-readable media may take many forms, such as non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read; punch cards, paper tape, any other physical medium with one or more patterns of holes, or any other non-transitory medium from which a computer instruction can be read.

While several embodiments of the present invention have been shown and described herein, it will be understood by those of ordinary skill in the art that various changes in form and details may be made therein without departing from the spirit and scope of the present invention—i.e., the invention is not limited to any embodiments described herein, but is defined by the appended claims and their equivalents.

What is claimed is:

1. A method performed by a receiver for generating a candidate search set for Maximal Likelihood (ML) detection of $2^n$-Quadrature Amplitude Modulation ($2^n$-QAM) signals transmitted on two or more Multiple Input Multiple Output (MIMO) spatial streams, comprising:
estimating an initial solution $y_q$ for a received $2^n$-QAM symbol value $b_0 b_1 \ldots b_{n-1}$, wherein all possible $2^n$-QAM symbol values are Gray-mapped constellation points; and
performing an iteration for each hypothetical value of each bit position i of the initial solution $y_q$, wherein each iteration comprises:
determining a search center as:
if $i^{th}$ bit of the initial solution equals the hypothetical value assumed for the current iteration, the initial solution $y_q$; or
if $i^{th}$ bit of the initial solution does not equal the hypothetical value assumed for the current iteration, a mirror constellation point $y_{qc}$ to the initial solution $y_q$; and
searching outward from the determined search center for candidate constellation points.

2. The method of claim 1, wherein each hypothetical value comprises one of 0 and 1.

3. The method of claim 1, wherein searching outward for candidate constellation points comprises:
selecting, for a candidate search set, constellation points whose $i^{th}$ bit equals the hypothetical value assumed for the current iteration.

4. The method of claim 1, wherein searching outward ceases when one of the two following conditions is met:
a number of search steps performed is equal to or greater than a value K; and
a search step is outside a known constellation boundary.

5. The method of claim 1, wherein, when the $i^{th}$ bit of the initial solution does not equal the hypothetical value assumed for the current iteration, the iteration further comprises:
determining the mirror constellation point $y_{qc}$.

6. The method of claim 5, wherein determining the mirror constellation point $y_{qc}$, where the $i^{th}$ bit of the mirror constellation point $y_{qc}$ does equal the hypothetical value assumed for the current iteration, comprises:
if the $i^{th}$ bit is in the real dimension, shifting a distance in the real dimension while remaining in the same position in the imaginary dimension; and
if the $i^{th}$ bit is in the imaginary dimension, shifting a distance in the imaginary dimension while remaining in the same position in the real dimension.

7. The method of claim 6, wherein shifting a distance in the real dimension while remaining in the same position in the imaginary dimension in order to determine the mirror constellation point $y_{qc}$ when the $i^{th}$ bit is in the real dimension comprises:
determining a shift distance $S_i$ using the following equation $$S_i(y_q) = \Pi_{k=1}^{i} b_k(y_q)$$

where:

$$b_i(y_q) = \begin{cases} 0, & L_i(y_q) < 0 \\ 1, & L_i(y_q) > 0 \end{cases}$$

and $$L_i(y_q) = \begin{cases} \text{real}(y_q), & i = 0 \\ -|L_{i-1}(y_q)| + D_i, & 0 < i < \frac{n}{2} \end{cases}.$$

8. The method of claim 7, wherein the real part of the mirror point $y_{qc}$ can be expressed as:

$$\text{real}(y_{qc}) = \text{real}(y_q) + S_i(y_q) \cdot L_i(y_q)$$

and the imaginary part of the mirror point $y_{qc}$ can be expressed as:

$$\text{imag}(y_{qc}) = \text{imag}(y_q).$$

9. The method of claim 6, wherein shifting a distance in the imaginary dimension while remaining in the same position in the real dimension in order to determine the mirror constellation point $y_{qc}$ when the $i^{th}$ bit is in the imaginary dimension comprises:
determining a shift distance $S_i$ using the following equation $$S_i(y_q) = \prod_{k=\frac{n}{2}}^{i} b_k(y_q)$$

where:

$$b_i(y_q) = \begin{cases} 0, & L_i(y_q) < 0 \\ 1, & L_i(y_q) > 0 \end{cases}$$

and $$L_i(y_q) = \begin{cases} \text{imag}(y_q), & i = \frac{n}{2} \\ -|L_{i-1}(y_q)| + D_i, & \frac{n}{2} < i < n \end{cases}.$$

10. The method of claim 9, wherein the real part of the mirror point $y_{qc}$ can be expressed as:

$$\text{real}(y_{qc}) = \text{real}(y_q)$$

and the imaginary part of the mirror point $y_{qc}$ can be expressed as:

$$\text{imag}(y_{qc}) = \text{imag}(y_q) + S_i(y_q) \cdot L_i(y_q).$$

11. The method of claim 1, wherein the initial solution $y_q$ comprises a closest constellation point, via quantization, to a Minimum Mean Error Square (MMSE) detection solution y.

12. A method performed by a receiver for generating a candidate search set for Maximal Likelihood (ML) detection of $2^n$-Quadrature Amplitude Modulation ($2^n$-QAM) signals transmitted on two or more Multiple Input Multiple Output (MIMO) spatial streams, comprising:
estimating an initial solution $y_q$ for a received $2^n$-QAM symbol value $b_0 b_1 \ldots b_{n-1}$, wherein all possible $2^n$-QAM symbol values are Gray-mapped constellation points; and
looking up a candidate search set corresponding to the initial solution $y_q$ in a Look-Up Table (LUT), wherein candidate search sets in the LUT were generated by:
performing an iteration for each hypothetical value of each bit position i of an initial solution $y_q$, wherein each iteration comprises:
determining a search center as:
if $i^{th}$ bit of the initial solution equals the hypothetical value assumed for the current iteration, the initial solution $y_q$; or if i bit of the initial solution does not equal the hypothetical value assumed for the current iteration, a mirror constellation point $y_{qc}$ to the initial solution $y_q$; and searching outward from the determined search center for candidate constellation points.

13. The method of claim 12, wherein searching outward for candidate constellation points comprises:

selecting, for a candidate search set, constellation points whose $i^{th}$ bit equals the hypothetical value assumed for the current iteration.

14. The method of claim 12, wherein searching outward ceases when one of the two following conditions is met:

a number of search steps performed is equal to or greater than a value K; and a search step is outside a known constellation boundary.

15. The method of claim 12, wherein, when the $i^{th}$ bit of the initial solution does not equal the hypothetical value assumed for the current iteration, the iteration further comprises:

determining the mirror constellation point $y_{qc}$.

16. The method of claim 15, wherein determining the mirror constellation point $y_{qc}$, where the $i^{th}$ bit of the mirror constellation point $y_{qc}$ does equal the hypothetical value assumed for the current iteration, comprises:

if the $i^{th}$ bit is in the real dimension, shifting a distance in the real dimension while remaining in the same position in the imaginary dimension; and if the $i^{th}$ bit is in the imaginary dimension, shifting a distance in the imaginary dimension while remaining in the same position in the real dimension.

17. A mobile device comprising:

a receiver configured to receive $2^n$-Quadrature Amplitude Modulation ($2^n$-QAM) signals transmitted from two or more Multiple Input Multiple Output (MIMO) spatial streams;

one or more processors capable of performing a method for generating a candidate search set for Maximal Likelihood (ML) detection of received $2^n$-QAM signals; and at least one non-transitory computer-readable medium storing instructions that, when executed, causes the one or more processors to perform the method for generating a candidate search set for ML detection of received $2^n$-QAM signals, the method comprising:

estimating an initial solution $y_q$ for a received $2^n$-QAM symbol value $b_0 b_1 \ldots b_{n-1}$, wherein all possible $2^n$-QAM symbol values are Gray-mapped constellation points; and performing an iteration for each hypothetical value of each bit position i of the initial solution $y_q$, wherein each iteration comprises:

determining a search center as:

if $i^{th}$ bit of the initial solution equals the hypothetical value assumed for the current iteration, the initial solution $y_q$; or if $i^{th}$ bit of the initial solution does not equal the hypothetical value assumed for the current iteration, a mirror constellation point $y_{qc}$ to the initial solution $y_q$; and searching outward from the determined search center for candidate constellation points.

18. The mobile device of claim 17, wherein parameters for performing the iterations are pre-generated and then stored in the mobile device by a manufacturer of the mobile device.

19. The mobile device of claim 17, wherein the parameters for performing the iterations are downloaded into the mobile device.

20. A mobile device comprising:

a receiver configured to receive $2^n$-Quadrature Amplitude Modulation ($2^n$-QAM) signals transmitted from two or more Multiple Input Multiple Output (MIMO) spatial streams;

one or more processors capable of performing a method for generating a candidate search set for Maximal Likelihood (ML) detection of received $2^n$-QAM signals; and at least one non-transitory computer-readable medium storing instructions that, when executed, causes the one or more processors to perform the method for generating a candidate search set for ML detection of received $2^n$-QAM signals, the method comprising:

estimating an initial solution $y_q$ for a received $2^n$-QAM symbol value $b_0 b_1 \ldots b_{n-1}$, wherein all possible $2^n$-QAM symbol values are Gray-mapped constellation points; and looking up a candidate search set corresponding to the initial solution $y_q$ in a Look-Up Table (LUT), wherein candidate search sets in the LUT were generated by:

performing an iteration for each hypothetical value of each bit position i of the initial solution $y_q$, wherein each iteration comprises:

determining a search center as:

if $i^{th}$ bit of the initial solution equals the hypothetical value assumed for the current iteration, the initial solution $y_q$; or if $i^{th}$ bit of the initial solution does not equal the hypothetical value assumed for the current iteration, a mirror constellation point $y_{qc}$ to the initial solution $y_q$; and searching outward from the determined search center for candidate constellation points.

21. The mobile device of claim 20, wherein the LUT was pre-generated and then stored in the mobile device by a manufacturer of the mobile device.

22. The mobile device of claim 20, wherein the LUT is downloaded into the mobile device.

23. The mobile device of claim 22, wherein the LUT is downloaded into the mobile device when initially started by a user of the mobile device.

24. A non-transitory computer-readable medium storing instructions that when executed by one or more processors to perform a method for generating a candidate search set for Maximal Likelihood (ML) detection of $2^n$-Quadrature Amplitude Modulation ($2^n$-QAM) signals transmitted on two or more Multiple Input Multiple Output (MIMO) spatial streams, the method comprising:

estimating an initial solution $y_q$ for a received $2^n$-QAM symbol value $b_0 b_1 \ldots b_{n-1}$, wherein all possible $2^n$-QAM symbol values are Gray-mapped constellation points;

performing an iteration for each hypothetical value of each bit position i of the initial solution $y_q$, wherein each iteration comprises:

determining a search center as:

if $i^{th}$ bit of the initial solution equals the hypothetical value assumed for the current iteration, the initial solution $y_q$; or if $i^{th}$ bit of the initial solution does not equal the hypothetical value assumed for the current iteration, a mirror constellation point $y_{qc}$ to the initial solution $y_q$; and searching outward from the determined search center for candidate constellation points.

25. A non-transitory computer-readable medium storing instructions that when executed by one or more processors to perform a method for generating a candidate search set for Maximal Likelihood (ML) detection of $2^n$-Quadrature Amplitude Modulation ($2^n$-QAM) signals transmitted on two or more Multiple Input Multiple Output (MIMO) spatial streams, the method comprising:
- estimating an initial solution $y_q$ for a received $2^n$-QAM symbol value $b_0 b_1 \ldots b_{n-1}$, wherein all possible $2^n$-QAM symbol values are Gray-mapped constellation points; and
- looking up a candidate search set corresponding to the initial solution $y_q$ in a Look-Up Table (LUT), wherein candidate search sets in the LUT were generated by:
  - performing an iteration for each hypothetical value of each bit position i of an initial solution $y_q$, wherein each iteration comprises:
    - determining a search center as:
      - if $i^{th}$ bit of the initial solution equals the hypothetical value assumed for the current iteration, the initial solution $y_q$; or
      - if $i^{th}$ bit of the initial solution does not equal the hypothetical value assumed for the current iteration, a mirror constellation point $y_{qc}$ to the initial solution $y_q$; and
    - searching outward from the determined search center for candidate constellation points.

26. A method performed by a receiver for generating a candidate search set for Maximal Likelihood (ML) detection of $2^n$-Quadrature Amplitude Modulation ($2^n$-QAM) signals transmitted on two or more Multiple Input Multiple Output (MIMO) spatial streams, comprising:
- performing an iteration for each hypothetical value of each bit position i of an initial solution y of a received $2^n$-QAM symbol value $b_0 b_1 \ldots b_{n-1}$, wherein all possible $2^n$-QAM symbol values are Gray-mapped constellation points, wherein each iteration comprises:
  - determining a search center as:
    - if $i^{th}$ bit of the initial solution equals the hypothetical value assumed for the current iteration, the initial solution $y_q$; or
    - if $i^{th}$ bit of the initial solution does not equal the hypothetical value assumed for the current iteration, a mirror constellation point $y_c$ to the initial solution y; and
  - searching outward from the determined search center for candidate constellation points.

27. The method of claim 26, further comprising:
storing each set of candidate constellation points for each possible initial solution y in a Look-Up Table (LUT).

28. The method of claim 26, further comprising:
varying one or more parameters of the iterations and then re-performing an iteration for each hypothetical value of each bit position i of each possible initial solution y with the varied one or more parameters; and
storing, for each of the varied one or more parameters, each set of candidate constellation points for each possible initial solution y in a Look-Up Table (LUT).

* * * * *